(12) United States Patent
Miller

(10) Patent No.: US 7,275,845 B2
(45) Date of Patent: Oct. 2, 2007

(54) ILLUMINATABLE WINDSHIELD ASSEMBLY

(76) Inventor: John F. Miller, 4183 N. 19th St., Milwaukee, WI (US) 53209

( * ) Notice: Subject to any disclaimer, the term of this patent is extended or adjusted under 35 U.S.C. 154(b) by 85 days.

(21) Appl. No.: 10/965,669

(22) Filed: Oct. 14, 2004

(65) Prior Publication Data
US 2005/0088850 A1 Apr. 28, 2005

Related U.S. Application Data

(60) Provisional application No. 60/510,685, filed on Oct. 14, 2003.

(51) Int. Cl.
*B60Q 1/26* (2006.01)
(52) U.S. Cl. ............... 362/503; 362/600; 362/610; 362/612; 362/615
(58) Field of Classification Search ............ 362/503, 362/600, 610, 612, 615, 800, 806, 812, 511, 362/473
See application file for complete search history.

(56) References Cited

U.S. PATENT DOCUMENTS

| | | | |
|---|---|---|---|
| 4,990,899 A | 2/1991 | Gerlitz et al. | |
| 6,157,297 A | 12/2000 | Nakai | |
| 6,250,767 B1 * | 6/2001 | Kusafuka et al. | 362/611 |
| 6,505,877 B1 | 1/2003 | Devlin et al. | |
| 6,550,953 B1 * | 4/2003 | Ichikawa et al. | 315/56 |
| 6,789,835 B2 | 9/2004 | Wargin et al. | |
| 6,910,783 B2 * | 6/2005 | Mezei et al. | 362/615 |
| 7,024,809 B1 * | 4/2006 | Poma | 40/546 |

FOREIGN PATENT DOCUMENTS

DE  10147259  * 4/2003

* cited by examiner

*Primary Examiner*—Stephen F Husar
*Assistant Examiner*—Mark Tsidulko
(74) *Attorney, Agent, or Firm*—Andrus, Sceales, Starke & Sawall, LLP

(57) ABSTRACT

An illuminatable windshield assembly, preferably for use on a motorcycle, but adaptable for use on all types of vehicles. The illuminatable windshield assembly includes a windshield comprised of a translucent panel having an outer peripheral surface wherein the panel has an opening formed therein defining an edge in the panel, a plurality of light emitting diodes mounted within the opening and arranged to emit light into the edge for illuminating at least a portion of the windshield, a source of electrical power for the light emitting diodes, and an electrical circuit connecting the light emitting diodes to the source of electrical power. Preferably, the source of electrical power is a battery for a motorcycle, and the windshield has an ornamental design etched therein which is illuminated by the light emitting diodes.

15 Claims, 2 Drawing Sheets

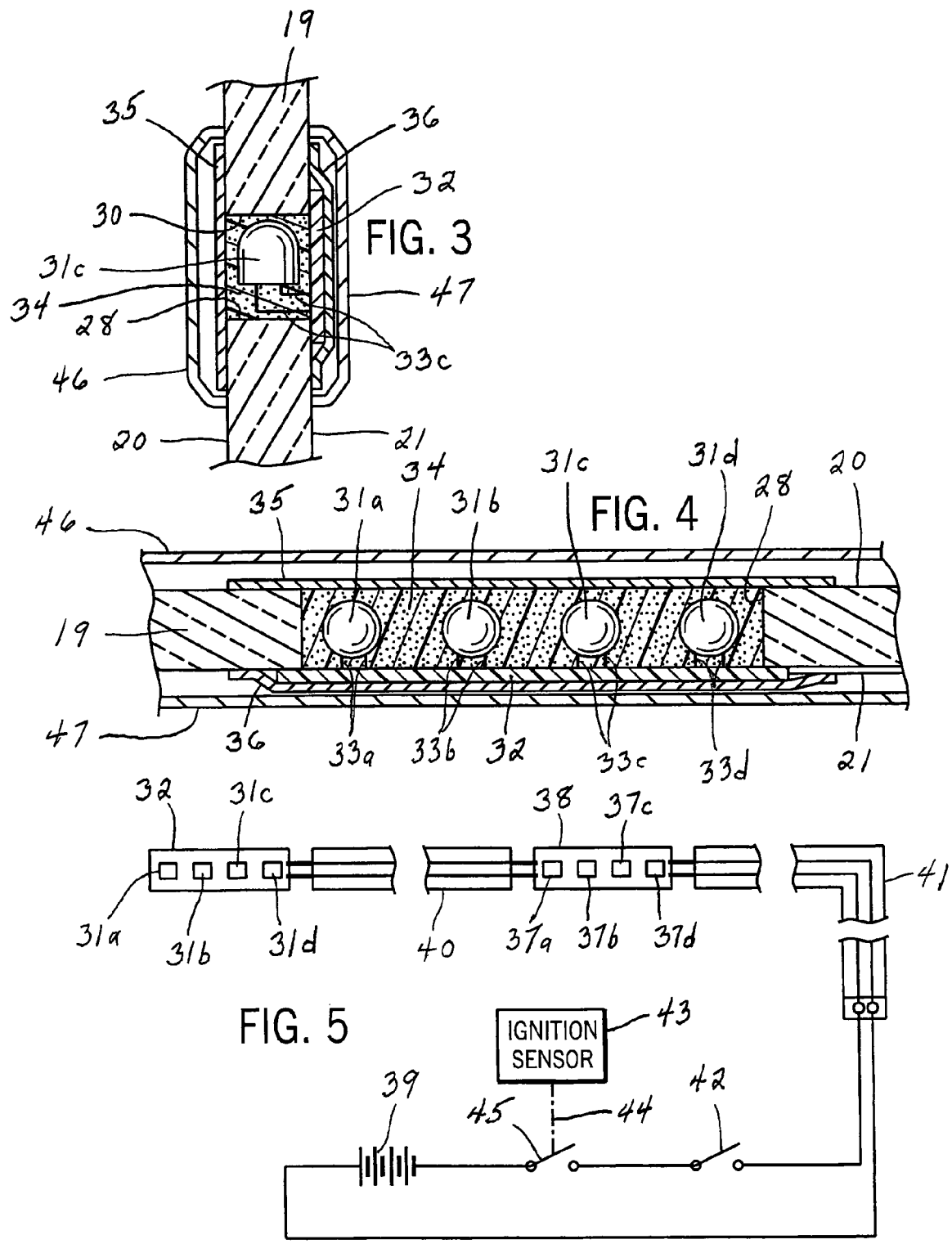

ILLUMINATABLE WINDSHIELD ASSEMBLY

CROSS REFERENCE TO RELATED APPLICATIONS

This application claims priority to U.S. Provisional Application No. 60/510,685, filed Oct. 14, 2003.

BACKGROUND OF THE INVENTION

The present invention relates to windshields, and more particularly to an illuminatable windshield assembly, especially adaptable for use on a motorcycle.

Motorcycle enthusiasts are known for accessorizing their motorcycles. For example, many motorcycle owners will "chrome out" their motorcycles by replacing original equipment with chromed parts, or by adding chromed components such as saddlebags, seats, exhaust systems and the like. Others use unique paint designs, leather accessories and/or decals to customize their motorcycles.

It is therefore desirable to provide new and unique components for motorcycles which will enable motorcycle owners to customize their motorcycles.

SUMMARY OF THE INVENTION

The present invention provides an illuminatable windshield assembly, preferably for use on a motorcycle, but adaptable for use on all types of vehicles. In its broadest application, the present invention provides an illuminatable windshield assembly comprised of a windshield having an edge, and a source of light arranged to emit light into that edge for illuminating at least a portion of the windshield. The edge may comprise the outer peripheral surface of the windshield, or the edge may comprise the perimeter of an opening formed in the windshield which opening is located interiorly of the outer peripheral surface. Preferably, the source of light is at least one light emitting diode.

In a particularly preferred embodiment, the illuminatable windshield assembly includes a windshield comprised of a translucent panel having an outer peripheral surface wherein the panel has an opening formed therein defining an edge in the panel, a plurality of light emitting diodes mounted within the opening and arranged to emit light into the edge for illuminating at least a portion of the windshield, a source of electrical power for the light emitting diodes, and an electrical circuit connecting the light emitting diodes to a source of electrical power. Preferably, the source of electrical power is a battery for a motorcycle, and the windshield has an ornamental design etched therein which is illuminated by the light emitting diodes. The electrical circuit preferably includes an ignition sensor for providing a signal indicating that the motorcycle is running, and a switch responsive to the signal for deactivating the light emitting diodes when the motorcycle is running.

BRIEF DESCRIPTION OF THE DRAWINGS

In the drawings:

FIG. 3 is a cross sectional view taken along the plane of the line 3-3 in FIG. 2 illustrating an end view of one of the light emitting diodes used in the windshield assembly;

FIG. 4 is a cross sectional view taken along the plane of the line 4-4 in FIG. 2 illustrating a top view of the light emitting diodes; and FIG. 5 is a schematic circuit diagram for an electrical circuit for the light emitting diodes used in the windshield assembly.

DETAILED DESCRIPTION OF THE INVENTION

Figure 1:
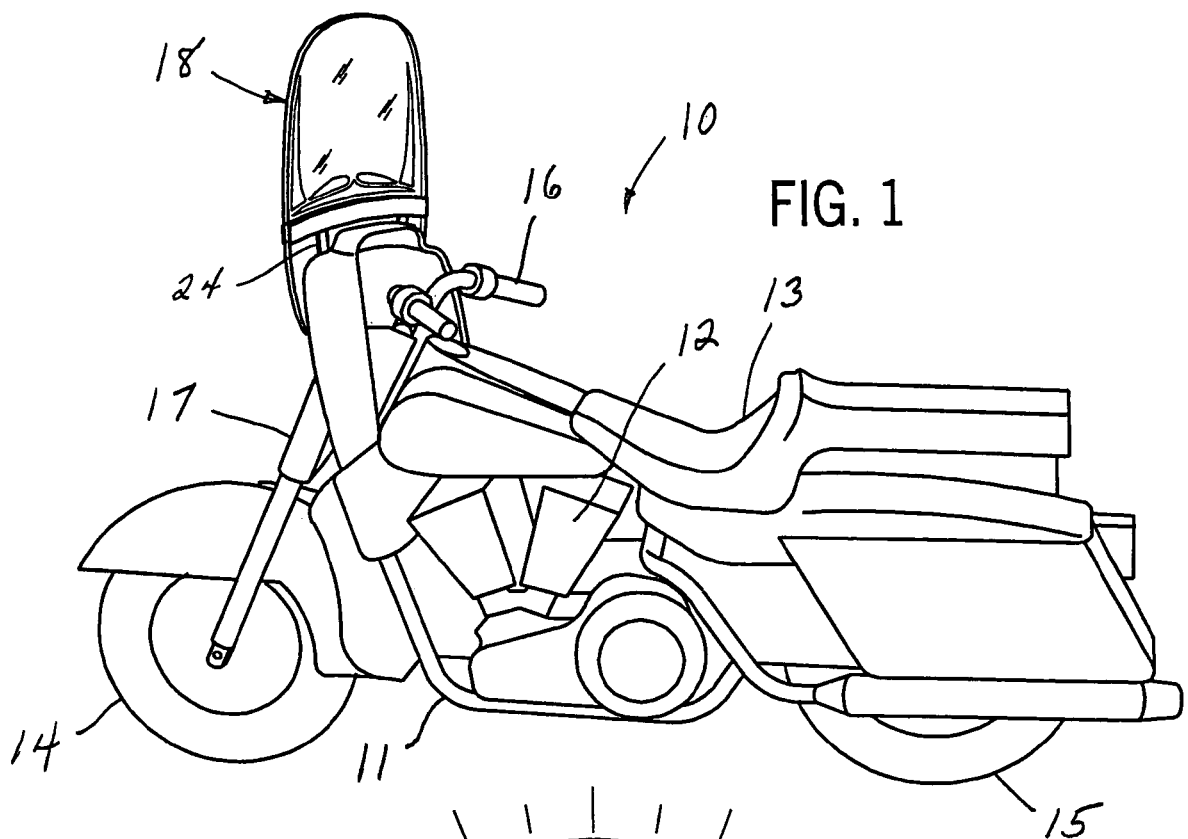
FIG. 1 is a side perspective view of a motorcycle with a windshield assembly constructed in accordance with the present invention.

Referring now to the drawings, FIG. 1 illustrates a motorcycle generally designated by the number 10 including a frame 11 supporting an internal combustion engine 12, a seat 13, a front wheel 14, a rear wheel 15 and a handlebar assembly 16. The handlebar assembly 16 is actuatable by a user to turn the front wheel 14 and thus steer the motorcycle 10 via a pair of fork members 17 (only one of which is shown in FIG. 1) in the conventional manner.

A windshield assembly generally designated by the number 18 is mounted to the front of motorcycle 10, for example to the handlebar assembly 16. The windshield assembly 18 includes a windshield 19 comprised of a translucent panel having a front surface 20, a rear surface 21, and an outer peripheral surface 22. Surface 22 is formed by the thickness or width of windshield 19. The windshield 19 is fabricated from a light transmissive or translucent material, preferably one that is transparent, and is formed from a tough, shatterproof or shatter-resistant, relatively stiff material, such as a polycarbonate. Laminated glass and plexiglass are also suitable depending upon the end use for windshield 19. A suitable thickness for use as a motorcycle windshield is about ¼" to ⅜".

Figure 2:
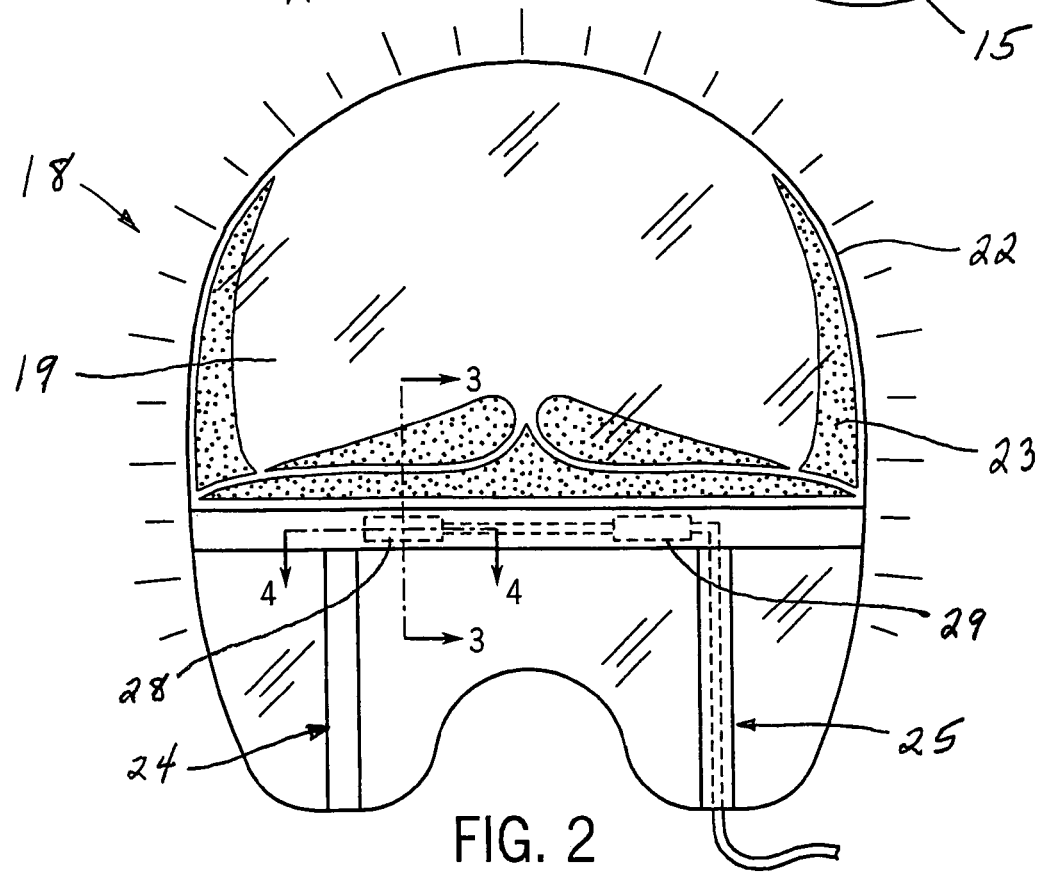
FIG. 2 is a front elevational view of the windshield assembly.

The windshield 19 is preferably formed to have a generally convex configuration which is positioned forwardly in the direction of travel so that front face 20 leads rear face 21 as the motorcycle is driven. This provides an aerodynamically efficient shape which reduces drag and also tends to disperse rain and other material to the sides and off the front surface 20 of windshield 19. The dimensions of windshield 19 can, of course, vary depending upon the size of the motorcycle, the model of motorcycle on which windshield 19 is used, and rider preference. Thus, although FIG. 2 illustrates windshield 19 so as to have a substantially spherical central portion and two depending portions on either side of a collar, all that is necessary is that the windshield be of a size and configuration sufficient to provide protection to a rider as noted above. Further, it should specifically be noted that although the present description and drawings illustrate windshield 19 in a configuration useful on motorcycle 10, the present invention is adaptable for use on windshields for all types of vehicles including automobiles, all-terrain vehicles, snowmobiles, boats, personal watercraft and the like.

As shown best in FIG. 2, windshield 19 preferably includes an ornamental design 23 formed in front surface 20 thereof. Ornamental design 23 may be of any desirable design. For example, design 23 may be in the form of flames, animals, and the like. Virtually any type of design that may be formed in the front surface 20 may be utilized. Typically, design 23 is etched into the surface 20 by means of a laser in a manner well known in the art. It should also be noted that although it is particularly desirable to include a design 23 on windshield 19 so that a rider can customer motorcycle 10, the present invention can be employed with windshields that are free of any ornamental design. In such a case, the peripheral surface 22 of windshield 19 will be illuminated instead of design 23.

Windshield 19 is mounted to the front of motorcycle 10 by means of a pair of spaced apart upstanding brackets 24 and 25 in a conventional manner. Each bracket 24, 25 includes a longitudinally extending C-shaped front member and rear member (not shown) having a configuration similar to cross members 46 and 47 illustrated in FIG. 3 and hereinafter to be described. The front members of brackets 24 and 25 both engage or bear against front surface 20 of windshield 19 while the rear members of brackets 24 and 25 both engage or bear against rear surface 21 of windshield 19. The upper ends of bracket 24 and 25 are connected or affixed to windshield 19 via fasteners (not shown) which extend through a resilient grommet (not shown) positioned in a through hole (not shown) in windshield 19, in a well known and convention manner. The lower ends of brackets 24 and 25 are likewise mounted in a conventional manner via fasteners to the front of motorcycle 10, typically the handlebar assemble 16. Thus, windshield 19 is mounted on motorcycle 10 to pivot as a rider pivots the handlebar assembly 16 and turns motorcycle 10.

As shown best in FIGS. 2-4, the windshield assembly 18 also includes a pair of spaced through openings 28 and 29 formed in the lower portion of windshield 19. As illustrated, openings 28, 29 are positioned in the lower half of windshield 19 and are spaced so that opening 28 is approximately ⅓ and opening 29 is approximately ⅔ of the distance across front surface 20 of windshield 19. However, openings 28 and 29 may be disposed at other locations depending upon the configuration of windshield 19 and the location and type of design 23. Openings 28 and 29 have a perimeter which defines an upper edge 30 in windshield 19. Edge 30 will typically be planar in shape and will extend substantially transversely with respect to surfaces 20 and 21 across the entire width or thickness of windshield 19. However, instead of extending completely through windshield 19, openings 28 and 29 could be blind openings and extend only partially into windshield 19 and the present invention would still be effective since a blind opening would also define an edge into which light will be emitted, as will hereinafter be described.

As shown best in FIGS. 3 and 4, each opening 28 and 29 receives a light emitting diode (LED) assembly which includes a plurality of light emitting diodes and a circuit board. Opening 28 contains light emitting diodes 31a-31d mounted to a circuit board 32 by means of wires 33a-33d respectively so that light emitted from LED's 31a-31d is emitted primarily in a direction parallel to circuit board 32 and upwardly into edge 30. It should be noted that although four LED's 31a-31d are illustrated in FIG. 4 in each opening 28 and 29, it is readily apparent that more or less LED's may be mounted therein. Thus, if brighter illumination is desired, more LED's should be employed. Whereas if less illumination is desired, less LED's should be employed. In any event, LED's 31a-31d are affixed within openings 28 and 29 via an adhesive 34, such as clear silicone rubber. Clear silicone is substantially light transmissive and thus will not hinder the passage of light emitted from the LED's 31a-31d into edge 30 of windshield 19. To further secure LED's 31a-31d within openings 28 and 29, adhesive tape 35 is applied on front surface 20 to cover opening 28 and another strip of adhesive tape 36 is employed to cover circuit board 32 and adhere to rear surface 21 of windshield 19.

FIG. 5 illustrates an electrical circuit connecting LED's 31a-31d and circuit board 32 in opening 28 with LED's 37a-37d and circuit board 38 mounted within opening 29 with a source of electrical power 39. Source 39 is preferably a battery and more preferably a battery for a motorcycle. As illustrated, the preferred circuit includes a wire assembly 40 interconnecting circuit boards 32 and 38 and a wire assembly 41 interconnecting circuit board 38 with battery 39. Wire assemblies 40 and 41 are preferably flat wires so that the assembly can be mounted substantially as flush as possible against rear surface 21 of windshield 19, as shown best in FIG. 2. An on/off switch 42 is disposed in the electrical circuit so that a rider may easily illuminate windshield 19 when desired. FIG. 5 also illustrates that the electrical circuit preferably includes an ignition sensor 43 that provides a signal indicating that the motorcycle 10 (or other vehicle) is running, and a switch 45 that is responsive to signal 44 for deactivating the LED's 31a-31d and 37a-37d when the motorcycle is running. Thus, when a rider starts engine 12, ignition sensor 43 will send signal 44 to switch 45 to cause switch 45 to open and prevent illumination of windshield 19. Thus, switch 45 is typically closed, but upon engine startup will open to prevent illumination of windshield 19.

In order to provide an attractive appearance for windshield 19, a front cross member 46 and a rear cross member 47 is employed to be positioned on front surface 20 and rear surface 21, respectively, at the location of openings 28 and 29. Cross members 46 and 47 will thus cover or enclose the LED assemblies which are comprised of LED's 31a-31d and 37a-37d as well as circuit boards 32 and 38. Cross members 46 and 47 are C-shaped, longitudinally extending strips of material and are mounted to windshield 19 in any conventional manner. For example, fasteners extending through a resilient grommet positioned in through holes in windshield 19 could be utilized. Preferably, cross members 46 and 47 are chrome plated strips of metal which will not only cover the LED assemblies to protect them against rain and the elements, but also provide an attractive appearance for windshield 19.

In order to provide an attractive appearance for windshield 19, a front cross member 46 and a rear cross member 47 is employed to be positioned on front surface 20 and rear surface 21, respectively, at the location of openings 28 and 29. Cross members 46 and 47 will thus cover or enclose the LED assemblies which are comprised of LED's 31a-31d and 37a-37d as well as circuit boards 32 and 38. Cross members 46 and 47 are C-shaped, longitudinally extending strips of material and are mounted to windshield 19 in any conventional manner. For example, fasteners extending through a resilient grommet positioned in through holes in windshield 19 could be utilized. Preferably, cross members 46 and 47 are chrome plated strips of metal which will not only cover the LED assemblies to protect them against rain and the elements, but also provide an attractive appearance for windshield 19.

In operation, a motorcycle rider would simply close switch 42 to connect battery 39 with LED's 31a-31d and 37a-37d so that these LED's emit light upwardly into edge 30. This will result in design 23 being illuminated. The design 23 can be illuminated in various colors depending upon the color of light emitted from the LED's. The illumination of design 23 is particularly effective at dusk or during nighttime.

I claim:

1. An illuminatable windshield assembly comprising:
  a windshield having an interior edge, a front surface, a rear surface and a frameless peripheral surface defining a thickness; and
  a source of light spaced internally from the peripheral surface, completely enclosed internally within the windshield between the front and rear surfaces thereof and arranged to emit light into the interior edge, the entire peripheral surface of the windshield assembly being illuminated by the source of light.

2. The windshield assembly of claim 1 wherein said windshield comprises a translucent panel.

3. The windshield assembly of claim 1 wherein said windshield comprises a translucent panel and said interior edge is located in said panel interiorly of said peripheral surface.

4. The windshield assembly of claim 3 wherein said panel has an opening formed therein defining a perimeter and said edge is said perimeter.

5. The windshield assembly of claim 4 wherein said opening is a through opening.

6. The windshield assembly of claim 4 wherein said opening is a blind opening.

7. The windshield assembly of claim 4 wherein said panel has a plurality of openings formed therein, and said source of light comprises a plurality of corresponding light emitting diodes mounted within said openings.

8. The windshield assembly of claim 4 wherein said source of light comprises a plurality of light emitting diodes mounted within said opening.

9. The windshield assembly of claim 1 wherein said source of light comprises at least one light emitting diode.

10. The windshield assembly of claim 1 wherein said windshield has an ornamental design formed therein.

11. An illuminatable windshield assembly comprising:
a windshield comprised of a translucent panel having a front surface, a rear surface and an outer frameless peripheral surface defining a thickness, said panel having an opening formed therein defining an interior edge in said panel;
at least one light emitting diode spaced internally from the peripheral surface, completely enclosed internally within the windshield within said opening between the front and rear surfaces and arranged to emit light into said interior edge, the entire peripheral surface of the windshield assembly being illuminated by the light emitting diode;
a source of electrical power for said at least one light emitting diode; and
an electrical circuit board connecting said at least one light emitting diode to said source of electrical power.

12. The windshield assembly of claim 11 wherein said source of electrical power is a battery.

13. The windshield assembly of claim 12 wherein said battery is a battery for a motorcycle.

14. The windshield assembly of claim 13 wherein said electrical circuit board includes an ignition sensor for providing a signal indicating that the motorcycle is running, and a switch responsive to said signal for deactivating said at least one light emitting diode when said motorcycle is running.

15. The windshield assembly of claim 11 wherein said windshield has an ornamental design formed into said translucent panel.

* * * * *